A. F. NESBIT.
ART OF PRODUCING ELECTRICAL PRECIPITATION OF PARTICLES FROM FLUID OR GASEOUS STREAMS.
APPLICATION FILED SEPT. 16, 1915.

1,357,202. Patented Oct. 26, 1920.
3 SHEETS—SHEET 2.

A. F. NESBIT.
ART OF PRODUCING ELECTRICAL PRECIPITATION OF PARTICLES FROM FLUID OR GASEOUS STREAMS.
APPLICATION FILED SEPT. 16, 1915.

1,357,202.  Patented Oct. 26, 1920.
3 SHEETS—SHEET 3.

WITNESSES

INVENTOR

UNITED STATES PATENT OFFICE.

ARTHUR F. NESBIT, OF WILKINSBURG, PENNSYLVANIA, ASSIGNOR TO INTER-NATIONAL PRECIPITATION COMPANY, A CORPORATION OF CALIFORNIA.

ART OF PRODUCING ELECTRICAL PRECIPITATION OF PARTICLES FROM FLUID OR GASEOUS STREAMS.

1,357,202.

Specification of Letters Patent.   Patented Oct. 26, 1920.

Application filed September 16, 1915. Serial No. 51,017.

*To all whom it may concern:*

Be it known that I, ARTHUR F. NESBIT, a citizen of the United States, residing at Wilkinsburg, in the county of Allegheny and State of Pennsylvania, have invented certain new and useful Improvements in the Art of Producing Electrical Precipitation of Particles from Fluid or Gaseous Streams, of which the following is a specification.

My invention relates to improvements in the art of separating solid and liquid particles from gaseous and fluid streams by electrical precipitation.

Possibility of precipitating particles from gaseous and fluid streams by the use of electrical discharges is well known, the discharges employed being the brush, point, corona, and other types, the general action being to form an ionization field between electrodes placed in or near the fluid or gaseous medium, the active electrode surface generally being smaller than that of the other electrode, the two electrodes forming what may be termed an asymmetrical pair. In practice, the ions are produced by the action of the discharges emanating from the active electrodes, the luminous, heat and ionizing effects being generally localized and very intense in the neighborhood of these electrodes.

Secondary ionization of the gaseous or fluid medium may also contribute very materially to the breaking down of the insulating difficulties of the medium. This ionization effect may be due to the collisions of the ions with the gaseous or fluid particles and give rise to the production of a large number of positive and negative ions. These ions will be repelled or attracted by the active electrode, dependent upon whether they are of similar or unlike charge, and where this secondary ionization is sufficiently intense and continuous, the flow of ions may be designated as a stream of ions or an electric current.

The removal of suspended particles in gaseous and fluid bodies by the electrical precipitation method involves the action of electric winds, the ionization of the medium, and, to a large extent, the formation of nuclei.

The electromagnetic wave is made up of two components, the electrostatic and the magnetic, the former accounting for the electric currents in the form of electrical discharges, which may be steady, disruptive, alternating, pulsating, or oscillating in character. These waves may be the so-called pure waves, in that their two components, due to the electrostatic field and the magnetic field, are of equal magnitude and constitute the ether-distortion or ether-motion states, both traveling along together and mutually sustaining each other. These electromagnetic waves may be made to travel along between two wires, between two broad sheets of metal, between two outer sheets of metal wholly or partly inclosing another sheet of metal, wire mesh, or a parallel grouping of wires. Between these forms of conducting surfaces, the electromagnetic wave moves along without spreading out by reason of its confinement in much the same manner as a sound wave is confined within a speaking tube through which it passes.

In the present invention, it is the purpose to utilize one or more of the well-known phenomena associated with electromagnetic waves, especially when these waves are so controlled as to give rise to more or less faint nodes and loops on the conductors constituting the electrode system, as well as in the dielectric medium through which the magnetic wave is passing.

Other and more specific objects of the invention are:—

(*a*) To establish, through the medium of an electrode sytem, a precipitating effect which is not only operative within the immediate zone between the electrodes of the system, but is also effective immediately in advance of such system to produce an agitating effect upon the medium being treated and thereby facilitate the precipitating action.

(*b*) To establish individual ionizing zones of definite form and length within the electrode system in such manner as to minimize discharge localization within the individual zones.

(*c*) To establish such individual ionizing zones within the flow path of the medium being treated in such manner that the medium, in traversing the fields provided by the electrode system, moves in directions angular to the directions of length of the zone.

(*d*) To provide an electrode system which is substantially rigid in construction and of a type in which the ionizing zones are made substantially constant in operation.

(e) To provide an electrode system which is operative at high efficiency whether the electromagnetic waves are of high or low frequency as well as of large or small amplitude.

(f) To provide an apparatus in which the electromagnetic waves may be controlled so that either their electrostatic or magnetic components may be made the predominating one at will.

(g) To provide an apparatus adapted to operate with electric potentials of high or low frequencies, and which will produce electric discharges which may be steady, disruptive, alternating, pulsating, or oscillating in character.

(h) To produce an apparatus for this purpose capable of maintaining its working conditions under exacting service conditions, which is of a form and structure not liable to material damage under such conditions, thereby reducing the necessity for repairs and renewals, and which is capable of treating large streams of gaseous or other fluid media.

To these and other ends, the nature of which will be readily understood as the invention is hereinafter disclosed, my invention consists in the improved methods of producing the efficient separation, and the combination and construction of parts hereafter fully described, illustrated in the accompanying drawings, and more particularly pointed out in the appended claims.

In the accompanying drawings, in which similar reference characters indicate similar parts in each of the views.

Fig. 10$^a$ is very similar to Fig. 10 and showing the employment of an outer electrode of slightly different configuration.

Fig. 16$^a$ is a diagrammatic sectional view of a modification.

Figures 1, 2:
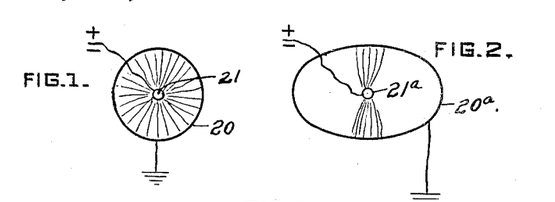
Figure 1 is a diagrammatic view of a simple form for producing a circular ionizing field.
Fig. 2 is a similar view showing the field arranged to provide ionizing zones, one of the electrodes being elliptical in conformation.

The formation of an electrode system having one electrode in the form of a circular member of small diameter such as a wire, with the other electrode in the form of a cylinder arranged concentrical about the wire will, as is well known, provide substantially similar radial electric strain lines within the space surrounding the member, and where there is a sufficient difference in potential between the two electrodes, this surrounding field will form a substantially circular or annular ionization zone, an arrangement of this type being shown in Fig. 1, 20 indicating a grounded electrode and 21 the active electrode. If, however, this true concentric relation between the two electrodes is disturbed, as by a shifting of the position of the inner electrode so as to bring it closer to one side than the other of the outer electrode, there is a radical change in the strain line conditions, due to the variation in length of radial gap between the two electrodes at different portions of the cylinder. Consequently, the uniformity of the circular ionization zone is materially disturbed, the zone increasing in activity as the radial length of the gap decreases, thereby tending to distort the circular ionization zone and individualize it along predetermined lines. Similarly, if the configuration of the outer electrode be varied so as to vary the radial length of the radial gaps at different points, as for instance, by forming the outer electrode elliptical in cross section, a similar effect will be produced, such arrangement individualizing the ionization zones, as shown for instance in Fig. 2, the electrodes being indicated at 20ᵃ and 21ᵃ respectively.

This result is due to the tendency of the strain lines to concentrate within the portion of the system having the radial gap of least length, this being the path of least resistance through the air or other medium which is between the electrodes. This effect is particularly seen in connection with the operations of electrical precipitating apparatus where the electrode system includes the central electrode and the cylindrical electrode concentric therewith. In such arrangement, any part of the inner electrode, which is generally the active electrode (the outer electrode being generally grounded) which is affected in such manner as to decrease the length of the radial gap at a particular point, causes a much greater strain-line concentration at such point, causing it to appear as a luminous point where the usual arrangement provides simply a corona effect on the electrode, thus tending to form a point discharge action instead of the corona discharge action, the immediate effect being to change the relationship between the point ionization zone and the remainder of the zone between the electrodes. Where a plurality of such points are produced, the general ionization zone becomes formed of a plurality of such comparatively small zones which operate individually with respect to the medium being treated instead of as a continuous ionization zone.

Figure 3:
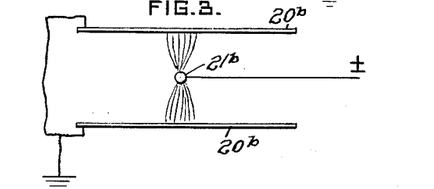
Fig. 3 is a diagrammatic view showing the idea of Fig. 2 applied to an electrode system having parallel walls.

A similar localization of the ionization zone is effected by changing the elliptical configuration of the outer electrode to one which has parallel sides with the inner electrode midway between these sides, the arrangement shown in Fig. 3, the electrodes being indicated at 20ᵇ and 21ᵇ respectively. Where the opposing surfaces of the parallel electrodes are smooth, the ionization zone will be substantially continuous throughout the length of the active electrode. Consequently, a plurality of inner or active electrodes extending in parallelism may be employed, these electrodes being spaced apart a proper distance, this spacing, if desired, being sufficient to retain the individuality of the ionization zones, thus forming a succession of localized zones extending in parallelism between the inner and outer electrodes, this being the arrangement shown in Fig. 4 in which the outer electrodes are shown as in the form of corrugated plates, thus additionally tending to individualize the zones. Obviously, if each zone is of extended length in the direction of length of the inner electrode and the medium to be treated is passed in a direction which intersects the direction of length of the zones, the entire medium stream will be subjected to the discharge action of the entire individual zone length, and, where a plurality of inner electrodes is employed, the stream will be subjected successively to the action of such successive zones as it passes between the opposite walls of the outer electrode while flowing in such direction.

This general arrangement of parallel ionization zones of definite length differs materially from the use of electrodes formed of wire mesh, a use heretofore proposed. This difference is due to the fact that in the wire mesh structure the crossing points of the wires necessarily produce variations in the distance between the inner and outer electrodes and consequently variations in the intensity of the field at such points. Such variations serve to concentrate the strain lines on such points and thus tend to produce the character of a point discharge instead of a discharge which is substantially uniform throughout the length of the zone. Decrease in the size of the mesh does not materially affect this difficulty, since such decrease is in a direction which more closely approaches the surface of a sheet or plane, a structure which is very unsuitable in its action in this type of apparatus owing to the extreme difficulty in producing two planes exactly parallel to each other.

These facts enable me to provide the inner electrode in the form of a frame, thereby permitting the formation of a substantially rigid structure in which the predetermined length of the radial gaps between the inner and outer electrodes may be maintained regardless of any vibratory action on the inner electrode wire produced by the action of the apparatus. An application of this principle is shown in Figs. 11–14, which will be more particularly described hereinafter.

Figure 5:
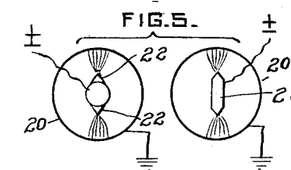
Fig. 5 is a diagrammatic view indicating different ways in which the formation of zones may be provided with a circular electrode.
Figure 6:
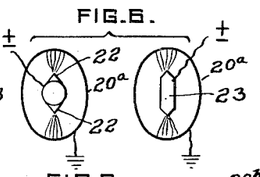
Fig. 6 is a diagrammatic view showing several ways in which the formation of ionizing zones may be provided with an elliptical electrode.
Figure 7:
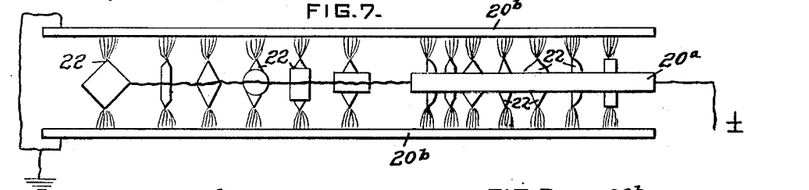
Fig. 7 is a diagrammatic view showing various ways in which ionizing zones may be produced, the view also indicating the manner in which a succession of such zones may be provided.

I have found that this concentration of the strain lines can be rendered more effective if the surface of the inner electrode is given a variation in cross sectional contour from the circular wire form, especially if this change results in producing an edge in opposition to the outer electrode, thus maintaining the continuity of the zone in the direction of length of the electrode, but still further concentrating the strain lines by reason of the decrease in width of the active surface on the electrode from that provided by the curved surface of the wire to practically a single line. Since the control of the strength of the field between the edge and the outer electrode still remains controlled by the length of the radial gap therebetween, the operation above referred to with respect to the rigid structure is applicable for use, regardless of the particular cross section of an individual electrode discharge member. This will be readily understood from Figs. 5 and 6, wherein the edges 22 are shown as formed on opposite sides of a circular wire, or the wire may be flattened to form a bar-like body portion 23 with the edges in proper position, or the electrode may be made angular in cross section to produce the edges 22, various forms of which are indicated in Fig. 7, which figure also indicates the ability to locate a plurality of such edges on a single member, this being possible by reason of the fact that the electrode members have the same sign of charge, and consequently no field is set up between opposing surfaces of such combined or connected members.

Obviously, an arrangement of this type can be rendered more rigid and less liable to damage in operation than where it is necessary to depend upon the tension of the wires to retain the constant length of the gaps between the inner and outer electrode which is desired in order to eliminate as far as possible the localized point discharge due to vibration. In addition, this arrangement tends to decrease the accumulation of deposits on the active electrode on the edge in a manner to vary this radial length of gap, the surfaces leading to the concentrating edge being such as to tend to clear such deposits; this fact combined with the fact that the active part of the edge of the electrode is practically a line instead of a comparatively extended surface of the curved wire, reduces this liability of the deposit accumulating and adhering to the electrode within the zone itself. Should such accumulation occur, it will be more rapidly cleared under a break-down action of the field when the accumulation reaches the stage where a disruptive discharge or arc is formed between the edge and the outer electrode.

Figure 8:
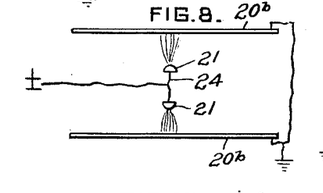
Fig. 8 is a diagrammatic view indicating one way in which the ionizing zones may be provided by a different form of structure.
Figure 9:
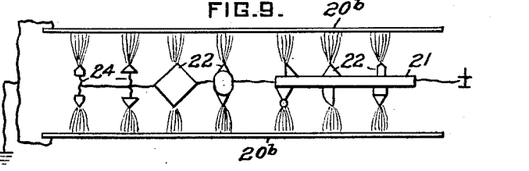
Fig. 9 is a view of the top of Fig. 7, also showing various ways in which a succession of zones may be formed.

As shown in Fig. 8, a somewhat similar effect will be provided by employing a pair of edges spaced apart across the width of the channel between the plates of the outer electrode, these edges being connected by a wire 24 so as to have the same charge sign. Such structure may be employed separately or in combination with other structures, as shown in Fig. 9. However, the fact that the structure of Fig. 8 would leave the space between the connected electrodes practically free from ionizing effects renders the solid structures of Figs. 7 and 9 more desirable in that the latter substantially forces the contents of the medium stream to pass through the ionization zones. Obviously, the outer electrode may have a concave or corrugated surface structure where this type of active electrode is employed, this being indicated in Fig. 10ª.

Various ways may be employed in carrying out the general principles of the invention above indicated with respect to the electrodes of the circular contour type or of the edge or angular type.

Figure 11:
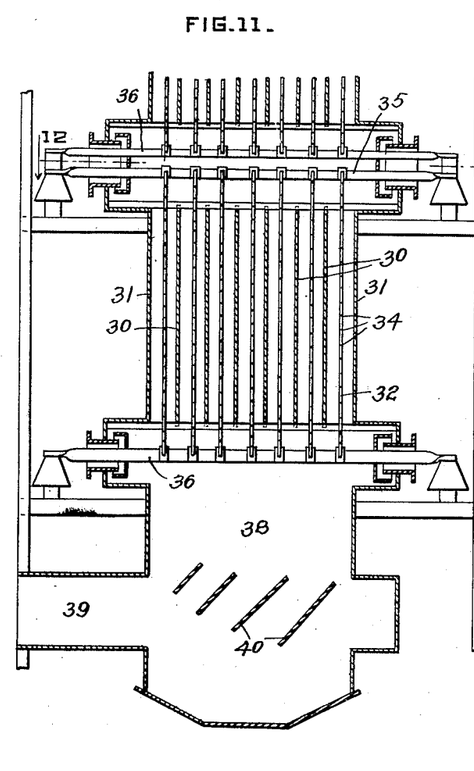
Fig. 11 is a sectional view of an apparatus which may be employed in carrying out the general principles of the invention.
Figure 12:
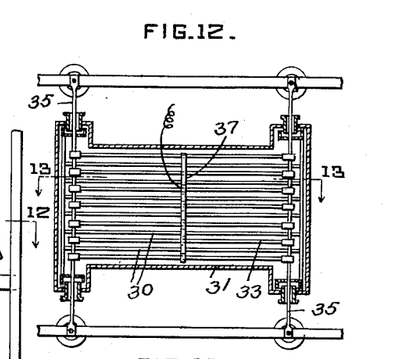
Fig. 12 is a sectional view taken on line 12—12 of Fig. 11.
Figure 13:
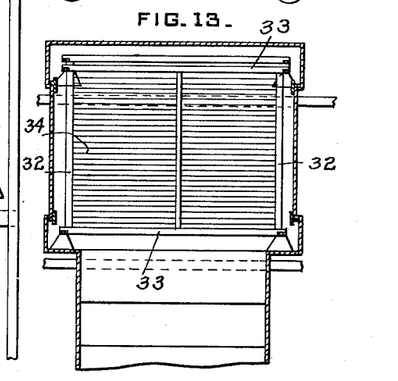
Fig. 13 is a sectional view taken on line 13—13 of Fig. 12.

In Figs. 4, and 11–14, I have shown several ways in which electrodes of the circular contour type, such as wires, may be employed. In Figs. 11–13, I have shown the wires as extending horizontally in parallelism and in vertical alinement, the arrangement shown illustrating a way in which a plurality of passageways or conduits for the medium to be treated may be provided, each conduit having its independent action. In this construction, the conduits are formed by the use of spaced apart plates 30 extending parallel to the outer walls 31 of the casing, thus causing the plates 30 to each form an electrode common to two conduits, these plates and the casing forming part of what may be termed the grounded electrode system. The inner or active electrode of each conduit is formed of a frame comprising side members 32 and end members 33, these being metallic and of suitable cross section, the individual electrodes being in the form of wires 34 strung between the side members 32, the wires extending horizontally and parallel with each other. This frame extends vertically through the conduit with the wires preferably spaced midway of the distance between the grounded electrodes of the conduit, each conduit having a similar frame, the several frames being supported above and, if desired, also below the conduits by bars 35 and 36 preferably supported externally of the casing, the bars 35 being preferably located in a manner to support the frame at the top of the frame sides.

By this arrangement, each individual active electrode (the frame) is substantially rigid structurally, and, in addition, the several frames are also supported rigidly by the bars 35 and 36, where the latter are employed. Consequently, the entire active electrode system which is thus produced is formed and supported fixedly with respect to the grounded electrode system with which the several electrode frames coöperate.

This rigid form of construction is of especial advantage by reason of the fact that the vibrations set up in the active electrode of previous types of apparatus are substantially eliminated or rendered ineffective. As is well known in connection with apparatus in which the electrode is in the form of a wire or other single member supported at one end, the variations in intensity of the direction of length of the ionization field due to the accumulation of particles on the electrode tend to produce material vibration to the electrode throughout its discharge length. Where the electrode has its length corresponding to the direction of length of the flow of the gaseous stream, this change in intensity also tends to affect the motion of the stream itself, tending to increase this vibratory effect; unless the grounded electrodes are rigidly secured, there is a tendency to set up physical vibrations in such grounded electrode, apart from the vibration due to tremor of the structure as a whole, the general tendency being to prevent uniformity in the ionization zones, these variations in intensity immediately producing a localizing effect on the zone, the strain lines concentrating at these particular points and thus materially varying the characteristics of the zone in the direction of its length. This necessarily affects the result produced on the gaseous stream, since there is material variation in intensity throughout the zonal length, such variations affecting the ionizing operation. Obviously, where the active electrode is of a type which lends itself to such localizing effect, as where the electrode is free to swing, this condition will rapidly occur and tend to render the apparatus somewhat unstable in operation.

On the contrary, the active electrode formation disclosed herein is such that the opposite ends of the portions of the electrode which produce the discharges are not only individually held against material vibration by the frame in which they are mounted, but, in addition, the fact that these individual discharge elements are each mounted in the same frame, the latter in itself not being intended to produce a material ionizing effect, increases the ability of the active electrode to resist such vibrations as would tend to set up such unstable condition; this is especially true by reason of the fact that the entire individual discharge element would be forced to move bodily in order to produce this result, thus producing a similar condition throughout the length of the zone instead of localizing the effect at one or more points in such zone length.

Where the frames are additionally braced at their lower ends, the additional support provided is such as would prevent bodily movement of the frame itself should extreme conditions arise as would set up vibrations of the frame through the changing of zone intensity produced throughout the length of one or more of the electrodes at the unsupported end of the frame.

The active electrode system is supplied with its current by connecting the electrode frames to a source of high potential, a connection of this type being indicated at 37, (Fig. 12) in the form of a bar. I preferably locate this connection at that portion of the system which is opposite the inlet ends of the conduits. For instance, in the structure shown in Figs. 11–13, I have shown this connection at the top of the active electrode system, the medium to be treated entering the conduits at the bottom, the lower ends of the conduits being in open communication with a chamber 38 into which the medium to be treated is introduced through a passageway 39, the chamber preferably having baffles 40 which tend to direct the medium toward and distribute it among the several conduits, the chamber also forming a collecting chamber for the precipitate.

The active electrode system is properly insulated in suitable manner, thereby providing for proper action between the several electrodes when current is supplied to the active electrode system.

In operation, I prefer to employ a voltage sufficient to produce a corona in connection with the discharge portions of the active electrode system, this being a phenomenon obtainable with this type of apparatus. Obviously, the entire active electrode system has the same sign of charge, and consequently, a proper spacing of the wires relative to each other tends to set up independent ionization zones having their direction of length coresponding to the direction of length of the wire strands, this direction, in the form of apparatus shown, extending horizontally, substantially parallel to the plane of the inlet end of the conduit, successive wires in the direction of flow of the medium forming successive zones through which the medium passes, each zone, under proper working conditions, extending throughout the width of the conduit, so that the medium is subjected successively to the action of these successive zones.

The general ionizing action which is set up in the several zones during the flow of the medium is well known, the dielectric capacity of the medium controlling, to a certain extent, the electromagnetic radiations. Where the active system is arranged along the lines herein indicated, this effect is somewhat increased, due to the tendency to form electric winds or whirls within the conduit, these tending to increase toward the lower ends of the conduits and having their maximum effect at the inlet ends of the conduit, the effect being more apparent within the chamber immediately in advance of the conduit entrance, this phenomenon being more particularly present at the opposite end of the system from that to which the connection with the source of potential is made. In the structure shown, this maximum effect is had within the chamber immediately in advance of the entrance to the conduits, the connection 37 being located at the opposite end of the active electrode system. This effect is very pronounced in the structure illustrated by reason of the frame-like effect of the lower end of the system, experiments having shown that these whirls are not materially localized, an action which might possibly occur where the electrode is in the form of a wire extending through a pipe with the lower end free from connection with an extended metallic surface. The particular location of this whirl-forming effect may be considered as an agitation field.

In the arrangement shown in these figures, I have shown a plurality of active electrode systems, the supporting bars extending through the walls of the casing and insulated therefrom preferably in a manner which will permit the entrance of external air at suitable points, this air being drawn into the casing by the suction action produced by the travel of the medium through the casing. This is optional, dependent upon the character of work.

As will be seen, this arrangement exposes but a small electrode surface for the collection of particles at points where such collections might materially affect the operation of the apparatus, the bars 35 and 36 being bent so that their flat faces are vertical. Consequently, the liability of accumulative collections of particles on the wires to an extent sufficient to cause the formation of a disruptive discharge or arc between the electrodes is materially reduced, in addition to which the disruptive action produced by the arc formation will tend to more rapidly break down the collection or deposit.

Figure 14:
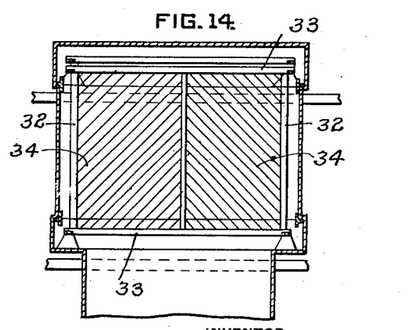
Fig. 14 is a view similar to Fig. 13 showing a modified form of an electrode system.

If desired, the wire electrodes may be arranged inclined, as shown in Fig. 14, thus giving an effect somewhat similar to that of the upper end of the fan parallel type of antennæ in the wireless telegraph system, the wires being arranged to extend in opposite directions, as shown, or having all of the wires of the frame extending in the same direction but parallel with each other, the particular construction being dependent upon the particular use and requirements of the installation. The degree of angularity of the wires relative to the direction of flow of the medium may, of course, be varied, but I prefer to provide a variation sufficiently great as to force the medium to pass through successive independent ionization zones as the medium flows through the conduits.

Figure 15:
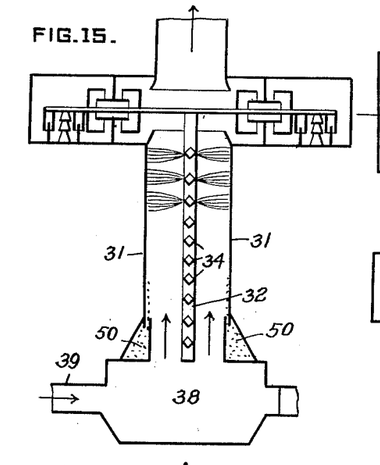
Fig. 15 is a diagrammatic view showing another way in which the present invention may be carried out.

The electrodes of the edge type may be substituted for the wires of the structures shown in Figs. 11-14, but I prefer to employ an arrangement differing somewhat from that construction where the edge form is employed. For instance, in Fig. 15, I have shown a single conduit having the frame built up of electrodes of the edge type, the flow of the medium being indicated by the arrows as upwardly through the conduit. The specific electrodes extend horizontally, forming ionization zones the length of which also is in a horizontal direction. I have also shown pockets 50 in the casing properly positioned to receive that portion of the material which is precipitated by contacting with the plates of the grounded electrode system, the flow path of the medium in this form being vertically through the conduit and thus successively intersecting the ionization zones formed by the grid-like structure of the active electrode system.

Figure 16:
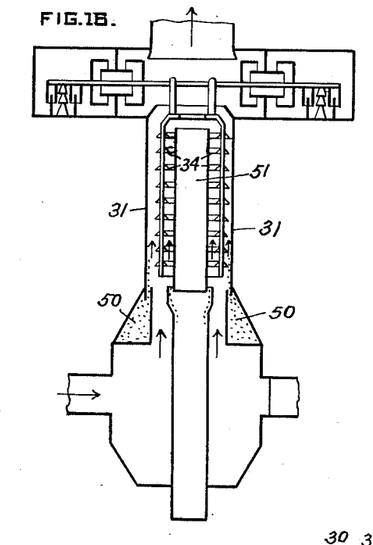
Fig. 16 is a diagrammatic view indicating a way in which a plurality of electrode systems may be produced in simple manner.
Figure 16A:
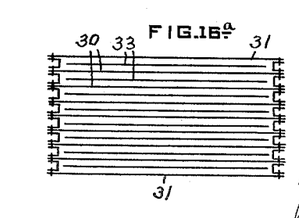

In Fig. 16 I have shown the idea adapted to a casing circular in cross section in which the conduit is made annular with respect to an inner member 51, the latter forming part of the grounded electrode system. In this form, the edges may be in the form of rings carried by a suitable support, or may be members mounted on a cylindrical support which extends parallel to the casing walls, the edge member and the cylindrical member forming the equivalent of the frame structure referred to. In this arrangement, provision is additionally made for the removal of the precipitated material which contacts with the walls of member 51. Obviously, this arrangement might be elongated in the direction of zone length to form separate conduits of the general form indicated in Fig. 15, thus providing a pair of conduits; however, I prefer for some purposes to make member 51 in the form of a plate where such elongated structures are mounted, thus enabling a somewhat sectional arrangement to be provided by a built up structure embodying parallel plates spaced apart at their side edges, these edges being joined together by channel members, thereby enabling the formation of a plurality of conduits in a similar manner and permitting the addition of conduits when necessary. A diagrammatic representation of such construction is shown in Fig. 16ª.

Figure 4:
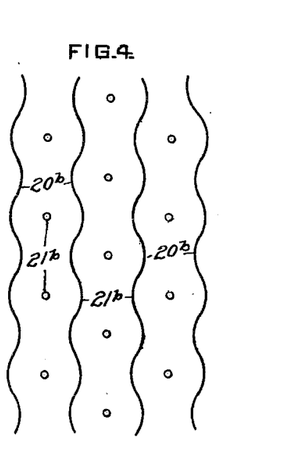
Fig. 4 is a diagrammatic view showing one way in which the ideas of Figs. 2 and 3 may be combined.
Figure 10:
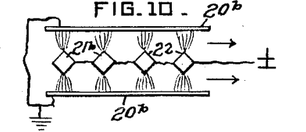
Fig. 10 is a diagrammatic view indicating the manner in which a succession of zones may be provided by electrodes of similar form.
Figure 10A:
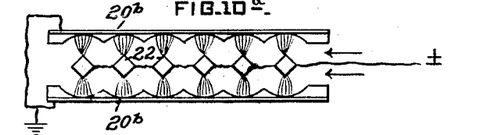
Figure 17:
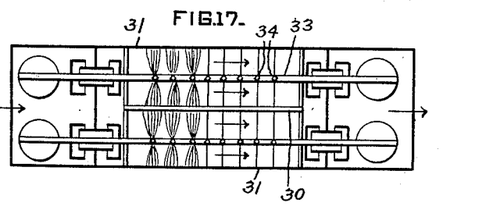
Fig. 17 is a diagrammatic view showing a still further modification, the view being in the nature of a horizontal section.
Figure 18:
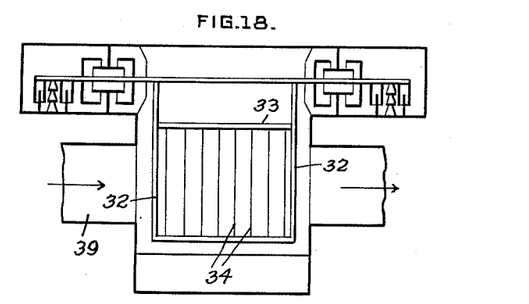
Fig. 18 is a diagrammatic view of the parts of Fig. 17, the view being in the nature of a vertical section.

As will be obvious, the general principles may be embodied in a construction in which the medium to be treated travels through the apparatus in a horizontal direction, Figs. 17 and 18 diagrammatically indicating an arrangement of this type, the active electrodes having their discharge edges extending vertically, the direction of length of the member supports extending in the direction of length of the conduit, thereby retaining the arrangement by which the material is caused to pass through successive ionization zones in traversing the conduit, pockets being directly underneath.

Where the flow path through the ionization field is in a horizontal direction, I have found it advantageous for certain purposes to form the grounded electrode of a corrugated type, such for instance, as shown in Figs. 4 and 10ª, the concave face of the grounded electrode of a zone acting somewhat in the nature of pockets, those solid or material particles which have, through the ionizing action, been thrown into contact with the grounded electrode and have, by this action, lost their charge, tend to drop by gravity within these depressions or pockets to the receptacle therebelow, being less liable to be picked up and carried onward by the scouring action of the stream. This form may also tend to carry particles into the more dense portion of the succeeding ionization zone, those particles which may be flowing through the weaker portion of a zone in proximity to the concave surface of the electrode being carried inward by the particular shape of these concave portions and thus placed in a position where the stream will carry them into desired portions of the zone. Obviously, this feature may also be employed in connection with vertically flowing streams, although in such case, the particles would drop through successive zones.

In Figs. 11–16 and 17 and 18, I have shown suitable baffle structures or dust shields, the numeral 60 tending to reduce liability of the dust, etc., passing out of the casing, these structures forming tortuous passageways which must be traversed by the dust in reaching the active electrode system-supporting portion of the casing, thus tending to decrease liability of affecting the insulated condition.

As heretofore pointed out, the invention contemplates the use of electric currents of high potential, although wide variations may be had as to frequency and amplitude of the electromagnetic waves, the apparatus operating with high efficiency with waves of high or low frequency and of large or small amplitude. The invention is also applicable for use with various types of electric current; I prefer, in most cases, however, to employ the unidirectional type, this having been found to be more efficient than the alternating type in this type of apparatus. The form of the unidirectional current may be varied to meet desired conditions. For instance, the source of current may provide an actual or approximate uniformity in the wave line, such as may be provided by batteries or high tension direct current machines, or the current may be intermittent or pulsating in character, or it may be oscillating in character and at the same time unidirectional, these various forms having their individual action on the ionization fields. Obviously, rectified alternating currents of various types may be employed for the purpose.

Figure 19:
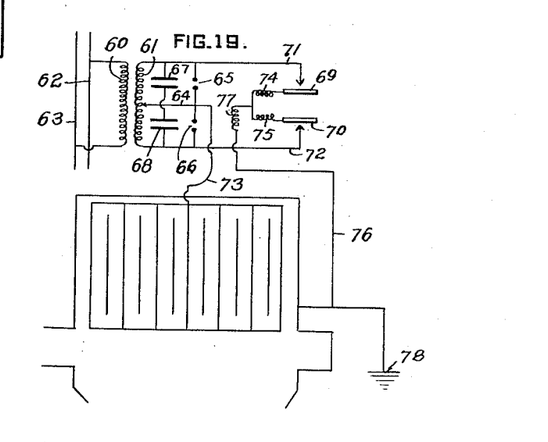
Fig. 19 is a diagrammatic view indicating one way in which to produce the required electrical circuits.

In the drawing I have shown in Fig. 19 one form in which the desired current may be provided. In this view, 60 and 61 represent respectively the primary and secondary of the transformer, the primary being connected to lines 62 and 63, the secondary 61 having a middle tap 64 connected to the center of a double spark gap 65, 66. The condensers 67 and 68 are connected across the terminals of the secondary. Asymmetrical spark gap rectifiers 69 and 70 are connected by leads 71 and 72 with the secondary 61. The active electrode system is connected to tap 64 through lead 73. The casing and negative electrodes, indicated as the grounded electrode system, are connected through lead 76 with inductances 74 and 75 leading from the spark gap rectifiers 69 and 70, inductance 77 being interposed between the system and inductances 74 and 75, the grounded terminal being indicated at 78. The several inductances serve their usual purpose of sustaining the current as the voltage wave is approaching its neutral or zero position.

While a current forming apparatus such as that just described may, in the absence of the precipitation apparatus cause intense ionic streams across the gaps of the rectifiers 69 and 70, tending to increase the hissing effect and may tend to produce arcs across the gaps, thus requiring adjustment of the gaps, the presence of the active and grounded electrodes system of a precipitation apparatus tends to reduce this necessity, the arrangement tending to maintain a quiet or slightly humming arc.

Obviously, other forms of apparatus may be employed. For instance, such apparatus may have various groupings of resistances, inductances, spherical spark gaps, etc., such combinations being intended as equivalents of the form shown in the drawings.

What I claim is:—

1. Apparatus for electrical precipitation comprising opposing electrode systems, the discharge system comprising a frame carrying rigidly a plurality of electrode elements extending in parallelism with each other and with one side of said frame.

2. Apparatus for electrical precipitation comprising opposing electrode systems, the discharge system comprising a rigid frame carrying rigidly a plurality of electrode elements extending in parallelism with each other and with one side of said frame.

3. Apparatus for electrical precipitation comprising opposing electrode systems, the discharge system comprising a frame carrying rigidly a plurality of electrode elements extending in parallelism with each other and with one side of said frame and transversely to the direction of gas flow.

4. Apparatus for electrical precipitation comprising opposing electrode systems, the discharge system comprising a rigid frame carrying rigidly a plurality of electrode elements extending in parallelism with each other and with one side of said frame and transversely to the direction of gas flow.

5. Apparatus for removing particles from fluid streams comprising opposing electrode systems having a discharge electrode and collecting electrode, said electrode systems being adapted to form an ionization field for diverting and collecting particles from the stream in proximity to the surface of the collecting electrode, said collecting electrode forming a conduit for the flow of the stream and collected particles through said ionization field, and means in approximate alinement with the electrode structure for isolating the traveling collection of particles and separating them from the stream, said means being located adjacent to one end of said ionization field..

6. Apparatus for removing particles from fluid streams comprising opposing electrode systems, including a collecting electrode structure, said systems being adapted to produce an ionization field for diverting particles from the stream and collecting them in proximity to the surface of the collecting electrode, and an element adjacent to one end of the collecting electrode structure to provide an outlet for collected particles independent of the stream.

7. Apparatus for removing particles from fluid streams comprising opposing electrode systems, including a collecting electrode structure, said systems being adapted to produce an ionization field for diverting particles from the stream and collecting them in proximity to the surface of the collecting electrode, an element adjacent to one end of the collecting electrode structure to provide an outlet for collected particles independent of the stream, and a deposit chamber in communication with said outlet.

8. Apparatus for removing particles from fluid streams comprising opposing electrode systems and having a discharge electrode and a tubular collecting electrode, said electrode systems being adapted to form an ionization field therebetween for diverting and collecting particles in said stream in proximity to the surface of the said collecting electrode, and means located adjacent to one end of said ionization field for trapping and isolating the collected particles from the fluid stream.

9. Apparatus for removing particles from fluid streams comprising opposing electrode systems and having a discharge electrode and a tubular collecting electrode, said electrode systems being adapted to form an ionization field therebetween for diverting and collecting particles in said stream in proximity to said collecting electrode, and means located adjacent to one end of said ionization field for trapping and isolating the collected particles from the fluid stream, said discharge electrode systems being arranged to produce an agitation field within the flow path in advance of the ionization field.

10. An electrical precipitation apparatus comprising concentric collecting electrodes with a discharge electrode system located therebetween, the discharge electrode system comprising a series of edge annular electrodes extending in each direction toward a collecting electrode, and supported on a hollow cylindrical structure.

11. An apparatus as claimed in claim 10 in which there is located adjacent the lower ends of the collecting electrodes, means for trapping and isolating the collected particles from the fluid stream.

12. Apparatus for removing particles from fluid streams comprising opposing electrode systems, including a collecting electrode structure and an edged discharge electrode structure, said systems being adapted to produce an ionization field for diverting particles from the stream and collecting them in proximity to the surface of the collecting electrode and an element adjacent to one end of the collecting electrode structure to provide an outlet for collected particles independent of the stream.

13. Apparatus for removing particles from fluid streams comprising opposing electrode systems, including a collecting electrode structure and an edged discharge electrode structure, said system being adapted to produce an ionization field for diverting particles from the stream and collecting them in proximity to the surface of the collecting electrode and means located adjacent to one end of said ionization field for trapping and isolating the collected particles from the fluid stream.

14. In the art of producing electrical precipitation of particles from fluid or gaseous streams, opposing electrode systems including a collecting electrode structure, said systems being adapted to produce an ionization field for diverting particles from the stream and collecting them in proximity to the surface of the collecting electrode, means for conducting the stream to said electrode systems, and means for separately collecting the cleaned stream of gases and the separated particles.

In testimony whereof I affix my signature in presence of two witnesses.

ARTHUR F. NESBIT.

Witnesses:
 MARY McLAUGHLIN,
 W. G. DOOLITTLE.